United States Patent
Yang et al.

(10) Patent No.: US 8,204,701 B2
(45) Date of Patent: Jun. 19, 2012

(54) AEROELASTIC MODEL USING THE PRINCIPAL SHAPES OF MODES (AMPS)

(75) Inventors: Ming-Ta Yang, Carlisle, MA (US);
James M. Bleeg, Middletown, CT (US);
James A. Eley, Middletown, CT (US)

(73) Assignee: United Technologies Corporation, Hartford, CT (US)

( * ) Notice: Subject to any disclaimer, the term of this patent is extended or adjusted under 35 U.S.C. 154(b) by 1397 days.

(21) Appl. No.: 11/763,649

(22) Filed: Jun. 15, 2007

(65) Prior Publication Data
US 2009/0099796 A1 Apr. 16, 2009

(51) Int. Cl.
*G01R 31/36* (2006.01)

(52) U.S. Cl. .............. 702/63; 702/56; 702/113; 702/189

(58) Field of Classification Search .................... 60/204, 60/223; 73/35.09, 571, 583; 244/99.13, 244/173.2, 174; 415/26, 119; 702/56, 113, 702/189, 63, 34, 35, 54, 75, 76, 115, 181
See application file for complete search history.

(56) References Cited

U.S. PATENT DOCUMENTS

| | | | |
|---|---|---|---|
| 5,141,391 A | 8/1992 | Acton | |
| 5,255,565 A * | 10/1993 | Judd et al. | 73/579 |
| 6,010,303 A | 1/2000 | Feulner | |
| 6,195,982 B1 | 3/2001 | Gysling | |
| 6,216,063 B1 | 4/2001 | Lind | |
| 6,471,482 B2 | 10/2002 | Montgomery | |
| 6,474,935 B1 | 11/2002 | Crotty | |
| 6,582,183 B2 | 6/2003 | Eveker | |
| 6,755,617 B2 | 6/2004 | Escuret | |
| 6,857,845 B2 | 2/2005 | Stabley | |
| 7,159,401 B1 | 1/2007 | Kurtz | |
| 7,206,709 B2 * | 4/2007 | Griffin et al. | 702/85 |

OTHER PUBLICATIONS

Zhang et al., 'Study on Flutter Characteristic of Cable-supported Bridges', 2003, Elsevier Publication, pp. 841-854.*
Yangjun et al., 'The Effects of Unsteady Interactions on Blade Flutter', Jun. 1997, CSB Publication, vol. 42, No. 11, pp. 960-962.*
Hansen et al., 'Two Methods for Estimating Aeroelastic Damping of Operational Wind Turbine Modes from Experiments', 2006, Wind Energy Publication, pp. 179-191.*
Pan et al., 'application of Singular-Value Decomposition for Structural Modal Analysis', Oct. 1991, JJAP, vol. 30, No. 10, pp. 2626-2635.*
Slone et al., A Finite volume unstructured mesh approach to dynamic fluid-structure interaction: an assessment of the challenge of predicting the onset of flutter, 2004, Elsevier, pp. 211-239.*
Ergin et al., 'Linear Vibration Analysis of Cantilever Plates Partially Submerged in Fluid', Mar. 2003, JF&S Publication, pp. 927-939.*

* cited by examiner

*Primary Examiner* — Michael Nghiem
*Assistant Examiner* — Elias Desta
(74) *Attorney, Agent, or Firm* — Carlson, Gaskey & Olds, P.C.

(57) ABSTRACT

The Aeroelastic Model using the Principal Shapes of modes (AMPS) is a method used to predict flutter in gas turbine engines. Modern gas turbine engines often include rotors with flexible disks and/or significant blade geometry variations. The AMPS method accounts for the varying blade mode shapes associated with flexible disks as well as changing blade geometry, providing accurate flutter predictions for a large number of modes from a relatively small number of CFD (computational fluid dynamics) simulations. The AMPS method includes determining a smaller set of principal shapes that approximates a larger set of structural modes of interest. Using linear superposition, aerodynamic forces associated with the vibration of the principal shapes can be used to construct the full aerodynamic coupling matrix associated with the structural modes of interest. An eigenvalue equation is solved to determine a damping distribution associated with the structural modes of interest. The damping distribution is predictive of flutter.

17 Claims, 2 Drawing Sheets

AEROELASTIC MODEL USING THE PRINCIPAL SHAPES OF MODES (AMPS)

BACKGROUND OF THE INVENTION

This invention was made with government support under Contract No. N00019-02-C 3003 awarded by the United States Air Force. The government therefore has certain rights in this invention.

This application relates to a method of predicting flutter of a rotor using an aeroelastic model based on principal shapes of modes (AMPS).

Most systems encountered from day to day are stable, however, a rotor in a gas turbine engine can be aero-mechanically unstable under certain conditions. During engine operation, the rotors spin rapidly and the air flows between the rotor blades at high speeds. Under these circumstances, the aerodynamics can be such as to destabilize a structural mode of the rotor, i.e. when the unstable mode is briefly excited, for example, by just a small gust of air, the amplitude of the vibratory response will grow instead of diminish. This phenomenon is known as "flutter."

Flutter, within turbo-machinery, is said to occur when a structure, such as a rotor blade or the rotor itself, begins to vibrate in the absence of any external forcing. The vibration due to flutter can result in a catastrophic engine failure. Specifically, flutter may cause a blade or blades to eventually crack and break resulting in damage to the engine. Therefore, when flutter is detected within the expected operating range of the engine, redesign is usually required.

In the interest of efficiency and performance, modern aircraft designers are tasked with designing an aircraft that is lighter. This generally entails more flexible structures, and more flexible structures bring an increased risk of flutter. The engine design cycle that involves designing, building, testing and redesigning is known as "build-and-bust" and is a very expensive way to develop an aircraft engine. As such, if the engine could be initially designed without flutter, it would result in an enormous cost savings to the engine maker.

As is known, while flutter is still commonly detected in initial engine designs, over the years, design tools including numerical methods have improved flutter prediction, reducing the number of build-and-bust cycles required to certify an engine. Known numerical methods include reduced order models, which are fast and computationally inexpensive, however their range of applicability is limited. Conversely, a higher order approach, such as a direct method, while applicable to a broader range of problems, is computationally expensive, as the direct method involves simulating each mode of interest.

These known direct method approaches of flutter prediction require running a great number of very large computational fluid dynamics (CFD) calculations, which can take many days or weeks to complete. As such, it is desirable to provide a method of flutter prediction that reduces both the number and the size of calculations required.

SUMMARY OF THE INVENTION

In a disclosed example embodiment of the present invention, an example flutter prediction system according to one embodiment of the present invention incorporates an Aeroelastic Model Using Principal Shapes of Modes (AMPS).

AMPS computes the aerodynamic damping for a large set of vibratory modes from a reduced set of computational fluid dynamics (CFD) calculations, while still capturing the effects of structural coupling, cyclically varying blade geometry, and blade mode shape changes due to veering. This is accomplished by taking the set of mode shapes from a rotor cyclic symmetry model and defining a smaller set of principal shapes (i.e. a set of principal shapes of modes), which approximately span the set of structural mode shapes. The Principal Shapes of Modes (PSM) are simulated with CFD calculations and the motion dependent forces are recorded. An aerodynamic coupling matrix is constructed for the set of structural mode shapes using linear superposition and used to determine an aerodynamic damping distribution, which is predictive of flutter.

These and other features of the present invention can be best understood from the following specification and drawings, the following of which is a brief description.

DETAILED DESCRIPTION OF THE PREFERRED EMBODIMENT

Figure 1:
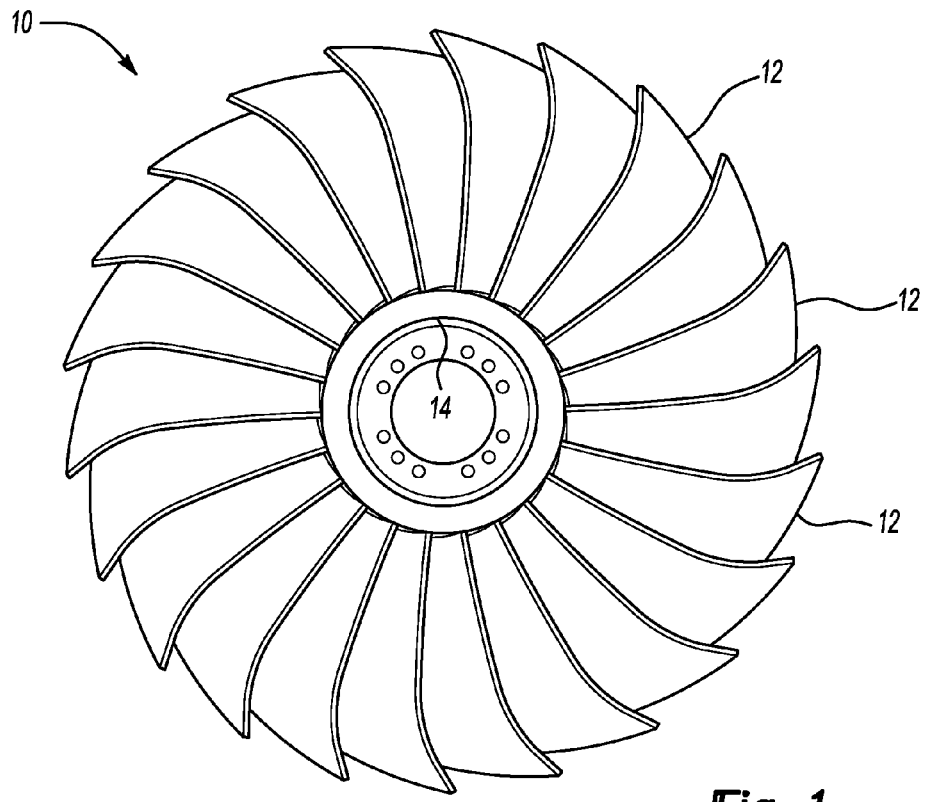
FIG. 1 shows an example rotor according to one embodiment of the present invention.

An example rotor 10 including rotor blades 12 extending from a disk 14 is illustrated in FIG. 1.

During engine operation, the rotor 10 spins rapidly and air flows between the rotor blades 12 at high speeds. Under certain circumstances, the aerodynamics can destabilize a structural mode of the rotor 10. When the unstable mode is briefly excited, for example, by a small gust of wind, the amplitude of the response will grow instead of diminish, i.e. the rotor 10 will "flutter."

Damping is the key in determining whether a given rotor will flutter. There are two primary types of damping: 1) structural damping; and 2) aerodynamic damping. For many rotors, the structural damping, which is always positive, is so small that it can be neglected. Therefore, aerodynamic damping is the critical parameter.

Aerodynamic damping is the manifestation of the unsteady (time-varying) aerodynamic forces on surfaces of the rotor blades 12 when a given mode vibrates. When a structural mode is perturbed, unsteady, i.e. time-varying, aerodynamic forces serve to either accentuate (negative damping) or diminish (positive damping) the response of the rotor blade, i.e. aerodynamic damping. The phase of these unsteady aerodynamic forces relative to the phase of the modal vibration of the rotor blade determines whether the damping will be positive or negative for that structural mode.

For most flutter analyses, the sign of the predicted aerodynamic damping for a given mode determines whether that particular structural mode is predicted to flutter. As such, when the aerodynamic damping is positive for all structural modes, the aerodynamic system is considered stable and the rotor 10 will not flutter. However, when the aerodynamic damping is negative for even a single mode (and the structural damping is negligible), the rotor 10 will invariably flutter. Therefore, the key to determining whether a new rotor design will flutter is predicting the aerodynamic damping for all of the critical modes.

A critical mode is defined for the rotor 10 by its natural frequency, blade mode shape, and inter-blade phase angle (IBPA), also known as "nodal diameter."

Figure 2:
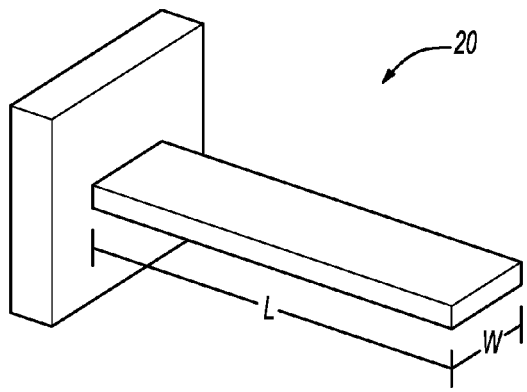
FIG. 2 shows a cantilever beam illustrative of blade modal deflections.
Figure 2:
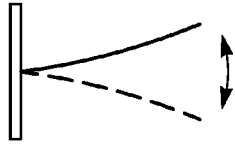
Figure 2:
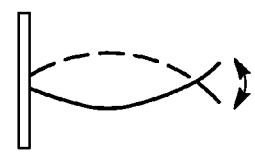
Figure 2:
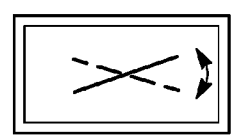

Blade mode shapes are based upon blade modal deflection patterns, which are similar to the deflections of a cantilever beam 20, i.e. 1B (bending), 2B (bending) and 1T (torsion), as illustrated in FIG. 2. Typically, only the blade mode shapes corresponding to the two lowest natural frequencies (usually 1B and 2B or 1B and 1T) of each rotor blade 12 are flutter risks, i.e. these blade mode shapes are considered blade mode shapes of interest.

IBPA defines the way neighboring blades vibrate relative to one another, i.e. is the phase angle relationship between neighboring blades. Two neighboring blades A, B can vibrate in phase with each other, 180° out of phase with each other, or somewhere in between. For example, when blade A moves left and blade B moves left at the same time, the blades A, B are said to be moving in phase with each other (IBPA=0°). Conversely, if blade B moves left when blade A moves right, the blades A, B are said to be moving out of phase with each other (IBPA=180°).

Therefore, if the rotor 10 has, for example, thirty (30) rotor blades 12, it can support thirty (30) IBPAs and, if there are two (2) blade mode shapes of interest, there would be sixty critical modes (30 IBPAs×2 blade mode shapes of interest).

Simplifying assumptions can be used to reduce the number of calculations required to complete a flutter analysis of all the critical modes. These assumptions may include the absence of blade-to-blade geometric variation, no structural coupling between neighboring blades through the rotor disk, and negligible mode shape variation with IBPA. While these are good assumptions for some rotors used in gas turbine engines today, many modern rotors include more flexible disks or intentional blade-to-blade geometric variation. In these modern rotors, the listed simplifying assumptions cannot be used, and alternative methods should be pursued to reduce the computational requirements of a full flutter analysis.

An example flutter prediction method according to the present invention is includes an Aeroelastic Model Using Principal Shapes of Modes (AMPS). AMPS computes the aerodynamic damping for a large set of modes from a reduced set of computational fluid dynamics (CFD) calculations, while still capturing the effects of structural coupling, cyclically varying blade geometry, and blade mode shape variation changes due to veering. This is accomplished by taking the set of structural mode shapes from a rotor cyclic symmetry model and defining a smaller set of principal shapes (i.e. set of principal shapes of modes), which approximately span the set of structural mode shapes. The Principal Shapes of the Modes (PSM) are simulated with CFD calculations using, for example, a known influence coefficient technique, and the motion dependent forces are recorded. An aerodynamic coupling matrix is constructed for the set of structural mode shapes using linear superposition. Once this step is completed, a flutter eigenvalue problem can be solved for an aerodynamic damping distribution, which, as discussed above, is predictive of flutter.

An equation of motion for a bladed-disk structure, e.g. a rotor, according to the present invention can be written as follows.

$$M\ddot{\vec{x}} + C\dot{\vec{x}} + K\vec{x} = \vec{f}_m + \vec{f}_e \quad (1)$$

Where $\vec{x}$ is the displacement of the structure from its equilibrium position, M, C, and K respectively are the mass, damping and stiffness matrices of the structure. $\vec{f}_m$ is a motion-dependent (vibration-induced) aerodynamic force, and $\vec{f}_e$ is an external aerodynamic force that is not vibration-induced. Note that the damping matrix C represents only structural damping, e.g. material and frictional damping. The aerodynamic damping effect is represented by the motion-dependent force $\vec{f}_m$.

For the purpose of flutter analysis, the structural damping and an external excitation force are assumed to be zero, i.e., $$C=0 \text{ and } \vec{f}_e = \vec{0} \quad (2)$$

The structural vibration, $\vec{x}$, and the motion-dependent force, $\vec{f}_m$ are assumed to be sinusoidal. Equation (1) can then be transformed to the following equation in the frequency domain.

$$(K-\omega^2 M)\vec{y} = \vec{p} \quad (3)$$

Where $\vec{y}$ is the complex amplitude of $\vec{x}$, $\vec{p}$ is the complex amplitude of $\vec{f}_m$, and ω is the oscillating frequency. For small amplitude oscillation, the motion-dependent force $\vec{p}$ can be approximated as a linear function of $\vec{y}$, i.e., $$\vec{p} = A\vec{y} \quad (4)$$

where A is an aerodynamic coupling matrix, which describes aerodynamic coupling among blades. A can be numerically estimated based on the following equation.

$$A = \nabla_{\vec{y}} \vec{p} |_{\vec{y}=\vec{o}} \quad (5)$$

Substituting Equation (4) into Equation (3) yields the eigenvalue problem for flutter analysis of a fluid-structural system:

$$(K-\omega^2 M-A)\vec{y} = \vec{0} \quad (6)$$

For a limited frequency range of interest, the size of Equation (6) can be significantly reduced. Based on a known theory of modal interaction, the structural amplitude can be approximated by the following equation.

$$\vec{y} = \Phi \vec{\beta} \quad (7)$$

Where Φ is a mode shape matrix containing a set of modes with frequencies that are close to the frequencies of interest, i.e., $$\Phi = [\vec{\phi}_1 \vec{\phi}_2 \vec{\phi}_3 \ldots \vec{\phi}_{\hat{N}}] \quad (8)$$

$\hat{N}$ is a number of down selected modes and $\vec{\beta}$ denotes the participation of the structural modes that comprise each aeroelastic mode. A mode shape $\vec{\phi}_r$ and its corresponding eigenvalue $\lambda_r$ satisfy the following structural eigenvalue problem.

$$(K-\lambda_r M)\vec{\phi}_r = \vec{0} \quad (9)$$

Substituting Equation (7) into Equation (6) and applying orthogonality of modes, the flutter eigenvalue problem in a modal form can be expressed as the following.

$$(\hat{K}-\omega^2 \hat{M}-\hat{A})\vec{\beta} = \vec{0} \quad (10)$$

As the size of the problem has been significantly reduced, the flutter eigenvalue problem of Equation (10) can be solved much more efficiently that its equivalent posed in Equation (6).

$\hat{K}$ and $\hat{M}$ respectively are the diagonal modal stiffness and the mass matrices of the structure. ω is a complex number including an aeroelastic system frequency as the real part of the complex number and an aeroelastic damping as the imaginary part of the complex number. $\hat{A}$ is the modal aerodynamic coupling matrix with the following expression.

$$\hat{A} = \Phi^H A \Phi \tag{11}$$

The dimension of the modal matrices in Equation (10) is $\hat{N} \times \hat{N}$, where, in a tuned rotor, $\hat{N}$ is typically a number of blades in the structure. Alternatively, in the case of a rotor with alternate blade mistuning, $\hat{N}$ is the number of blades divided by two (2).

Further, for example, consider a bladed disk with a rotational periodicity of N. The aerodynamic coupling matrix A can be written in the following block-circulant form.

$$A = \begin{bmatrix} A_0^{[0]} & A_1^{[0]} & \cdots & A_{N-1}^{[0]} \\ A_{N-1}^{[0]} & A_0^{[0]} & \cdots & A_{N-2}^{[0]} \\ \vdots & \vdots & \ddots & \vdots \\ A_1^{[0]} & A_2^{[0]} & \cdots & A_0^{[0]} \end{bmatrix} \tag{12}$$

Where $A_r^{[s]}$ is the effect of a unit vibration of the $r^{th}$ sector on the $s^{th}$ sector and, for all $r = 0, \ldots, N-1$., $$A_r^{[r]} = A_0^{[0]} \tag{13}$$

$$A_r^{[0]} = A_0^{[N-r]} \tag{14}$$

Note that, though the sectors are numbered from 0 to N−1 in Equation (12), because of rotational periodicity, sector N and sector 0 refer to the same sector, sector (N−1) and sector-1 refer to the same sector, and so on.

The $r^{th}$ mode shape vector $\vec{\varphi}_r$ of the rotor can be written as $$\vec{\varphi}_r = \begin{Bmatrix} \vec{\varphi}_r^{[0]} \\ \vec{\varphi}_r^{[1]} \\ \vdots \\ \vec{\varphi}_r^{[N-1]} \end{Bmatrix} \tag{15}$$

where $\vec{\varphi}_r^{[s]}$ is the component of $\vec{\varphi}_r$ that is associated with the $s^{th}$ sector. The rotational periodicity of the structure implies $$\vec{\varphi}_r^{[s]} = \vec{\varphi}_r^{[q]} e^{i2\pi(s-q)\frac{n}{N}} \tag{16}$$

with n being the phase index (or, nodal diameter pattern) of mode $\vec{\varphi}_r$, and s, q = 0, 1, ..., N−1.

Similarly, with $\Phi^{[s]}$ being defined as the component of $\Phi$ that is associated with the $s^{th}$ sector $$\Phi^{[s]} = [\vec{\varphi}_1^{[s]} \vec{\varphi}_2^{[s]} \vec{\varphi}_3^{[s]} \ldots \vec{\varphi}_{\hat{N}}^{[s]}] \tag{17}$$

the mode shape matrix $\Phi$ can be written as $$\Phi = \begin{bmatrix} \Phi^{[0]} \\ \Phi^{[1]} \\ \vdots \\ \Phi^{[N-1]} \end{bmatrix} \tag{18}$$

The mode shape matrix components $\Phi^{[s]}$ and $\Phi^{[q]}$ are correlated by a phase transformation matrix E $$\Phi^{[s]} = \Phi^{[q]} E^{s-q} \tag{19}$$

Without losing generality, let $\Phi^{[0]}$ denote the mode shape matrix component with the reference sector. $\Phi^{[0]}$ can be determined by conducting a finite element analysis of the structure.

However, for a set of modes within a frequency range of interest the columns of $\Phi^{[0]}$, namely, $\vec{\varphi}_r^{[0]}$ (r=1, 2, ..., $\hat{N}$) have a lot of similarities. For example, in the extreme case of a perfectly rigid disk, all $\vec{\varphi}_r^{[0]}$ within a single blade mode family are identical. In the case of a flexible disk, the $\vec{\varphi}_r^{[0]}$ within a blade mode family would have characteristics similar to the corresponding cantilever blade mode, but also include differences due to blade root motion. Mathematically, $\Phi^{[0]}$ can be expressed in terms of a singular value decomposition.

$$\Phi^{[0]} = USV^H \tag{20}$$

U and V are unitary orthonormal matrices that represent the column and row spaces of $\Phi^{[0]}$. The columns of U, $\vec{u}_r$ (r = 1, 2, ..., $\hat{N}$) are the Principal Shapes for the Modes of Interest (PSM), and S, the singular value matrix, is diagonal with each singular value denoting the importance of its corresponding PSM.

For example, suppose that the first $\tilde{N}$ PSM can be used as a basis to represent $\Phi^{[0]}$ with acceptable errors. In this example, one can write $$\Phi^{[0]} = \tilde{U} Z \tag{21}$$

$\tilde{U}$ is the matrix containing a reduced set of PSM, i.e. the $\tilde{N}$ most significant columns of U, and Z is the corresponding coefficient matrix.

By substituting Equations (12), (13), (14), (18), and (19) into Equation (11), the modal aerodynamic coupling matrix $\hat{A}$ can be expanded as follows.

$$\hat{A} = \sum_{r=0}^{N-1} \sum_{s=0}^{N-1} (E^{r+1})^H \Phi^{[0]H} A_0^{[s]} \Phi^{[0]} E^{r-s+1} \tag{22}$$

Now substitute Equation (21) into Equation (22) and let $$\tilde{P}^{[s]} = A_0^{[s]} \tilde{U} = [\vec{\tilde{p}}_1^{[s]} \vec{\tilde{p}}_2^{[s]} \ldots \vec{\tilde{p}}_{\tilde{N}}^{[s]}] \tag{23}$$

The modal aerodynamic coupling matrix can be computed by $$\hat{A} = \sum_{r=0}^{N-1} \sum_{s=0}^{N-1} (E^{r+1})^H \Phi^{[0]H} \tilde{P}^{[s]} Z E^{r-s+1} \tag{24}$$

In Equation (24), $\vec{\tilde{p}}_r^{[s]}$, the $r^{th}$ column of $\tilde{P}^{[s]}$, is the aerodynamic force on the $s^{th}$ sector induced by the reference vector vibrating in a unit of the $r^{th}$ PSM, $\vec{u}_r$. $\vec{\tilde{p}}_r^{[s]}$ can be computed by CFD routines with prescribed blade structural motion.

Equations (24) and (10) are the general equations that form the backbone of the AMPS method. They account for structural coupling, blade mode shape changes with nodal diameter, and cyclically varying geometry.

By substituting Equation (24) into the now simplified Equation (10), Equation (10) is solved for $\omega$ and $\vec{\beta} \cdot \omega$, which is/are the eigenvalue(s) associated with the aeroelastic modes, includes both the aeroelastic frequency and the aeroelastic damping. $\vec{\beta}$ is/are the eigenvector(s), which define the aeroelastic mode shape(s). The aeroelastic damping distribution is now known, the analysis of which is predictive of flutter.

Figure 3:
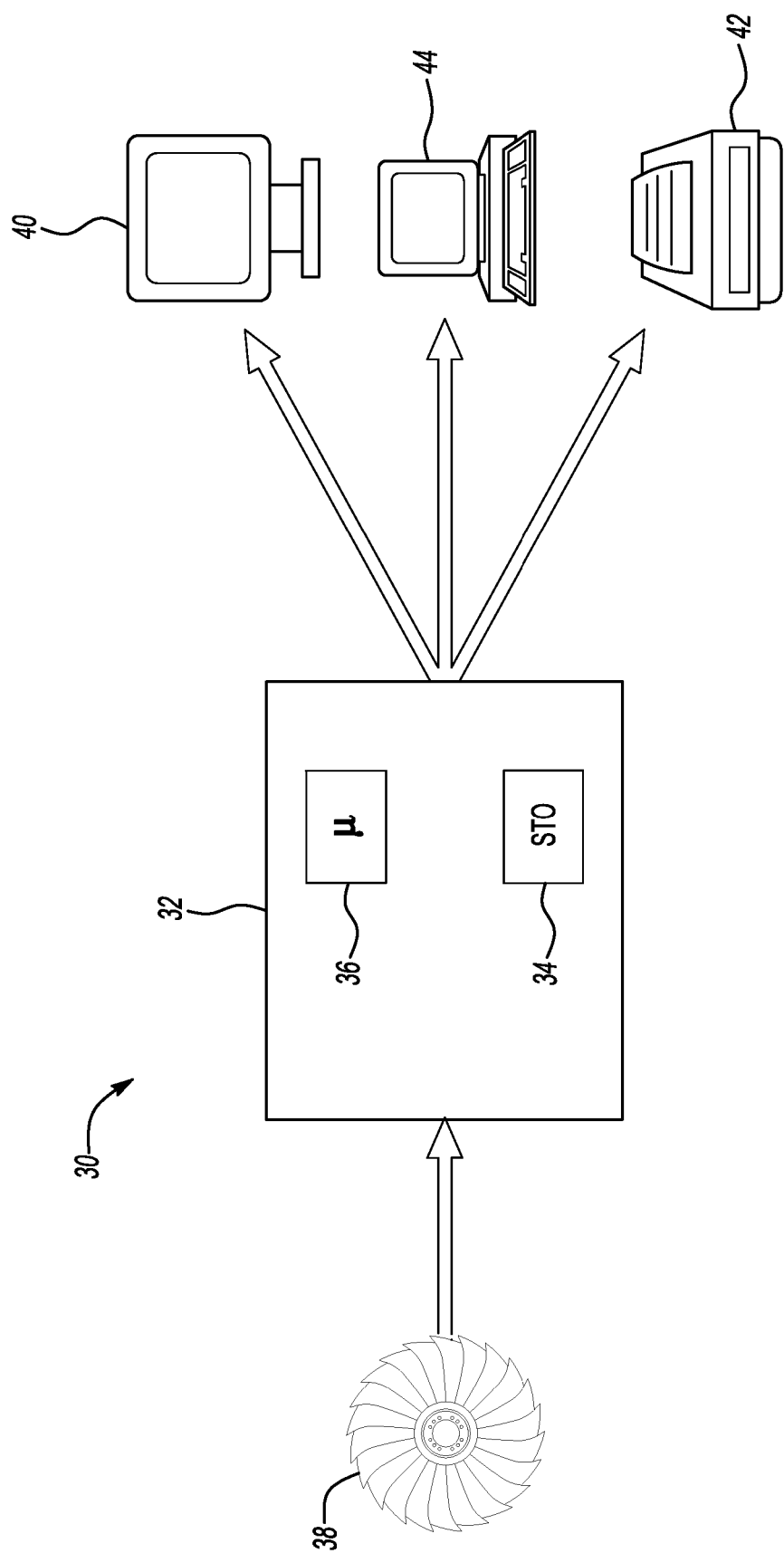
FIG. 3 illustrates a flutter prediction system according to one embodiment of the present invention.

An example flutter prediction system 30 according to one embodiment of the present invention including the AMPS method is shown as FIG. 3.

The flutter prediction system 30 includes a computer 32, which includes a processor 34 and storage 36. A hard drive and memory are contained within the storage 36. The computer 32 is operable to execute the AMPS program, which can be stored on a computer readable medium within the storage 36.

The computer 32 receives data from a CAD model 38, or other form of electronic rendition of a component (rotor or vane). The model 38 is temporarily stored within the storage 36. The model 38 includes data, for example, from a finite element analysis, which defines the set of structural mode shapes. The AMPS method is employed by the system 30 to represent the set of structural mode shapes with a smaller set of principal shapes, as discussed above, and to ultimately determine an output, i.e. the aerodynamic damping distribution. By deriving the aerodynamic damping distribution for the set of structural modes from a smaller set of principal shapes, the overall number, and sometimes the size, of the computational fluid dynamics calculations required is greatly reduced, significantly reducing the overall computing time required.

The aerodynamic damping distribution can be stored within the storage 36 for future reference, displayed on a computer screen 40, sent to a printer 42 or sent to another computer 44 for further processing.

Although preferred embodiments of this invention have been disclosed, a worker of ordinary skill in this art would recognize that certain modifications would come within the scope of this invention. For that reason, the following claims should be studied to determine the true scope and content of this invention.

What is claimed is:

1. A method of predicting flutter comprising the steps of:
providing a non-transitory computer readable medium containing instructions stored therein for causing a computer to perform the following steps;
determining a set of structural mode shapes;
defining a set of principal shapes of modes based on the set of structural mode shapes, wherein the set of principal shapes is smaller than the set of structural mode shapes and wherein said principal shapes of modes is determined using singular value decomposition;
determining an aerodynamic damping distribution for the set of structural mode shapes based upon the set of principal shapes of modes; and
predicting flutter based on the aerodynamic damping distribution.

2. The method of predicting flutter as recited in claim 1, further including the step of constructing an aerodynamic coupling matrix based upon the set of principal shapes of modes, wherein the aerodynamic coupling matrix is used to determine the aerodynamic damping distribution.

3. The method of predicting flutter as recited in claim 2, further including the steps of:
calculating aerodynamic forces induced by the principal shapes of modes; and
using linear superposition to compute aerodynamic forces induced by vibration of the set of structural mode shapes from the aerodynamic forces induced by the vibration of the principal shapes.

4. The method of predicting flutter as recited in claim 1, wherein the set of principal shapes approximately spans the set of structural mode shapes.

5. A flutter prediction system comprising:
a computer including:
a processor; and
storage including a computer program which, when executed by the computer, defines a set of principal modes shapes, smaller than the set of structural mode shapes, and determines a damping distribution for the set of structural mode shapes based upon the set of principal shapes and wherein the set of principal mode shapes are defined using singular value decomposition.

6. The flutter prediction system as recited in claim 5, further including an electronic representation of a component, which is inputted into the computer, and wherein the set of structural mode shapes is based upon a finite element analysis of the electronic representation.

7. The flutter prediction system as recited in claim 6, wherein the damping distribution is predictive of flutter.

8. A non-transitory computer readable medium storing a computer program which, when executed by a computer performs the steps of:
receiving an electronic representation of a component;
generating a set of structural mode shapes based upon the electronic representation;
defining a set of principal shapes based on the set of structural mode shapes, wherein the set of principal shapes is smaller than the set of structural mode shapes and wherein the set of principal mode shapes is determined using singular value decomposition;
determining an aerodynamic damping distribution for the set of structural mode shapes based upon the set of principal shapes;
predicting flutter based on the aerodynamic damping distribution; and
generating an output detailing the flutter prediction.

9. The non-transitory computer readable medium as recited in claim 8 which, when executed by the computer, simulates the set of principal shapes.

10. The non-transitory computer readable medium as recited in claim 9, wherein aerodynamic forces induced by vibration of the set of principal shapes are recorded.

11. The non-transitory computer readable medium as recited in claim 10 which, when executed by the computer, constructs an aerodynamic coupling matrix based upon the recorded aerodynamic forces induced by the vibration of the set of principal shapes.

12. The non-transitory computer readable medium as recited in claim 9, wherein the coupling matrix is constructed using linear superposition.

13. The non-transitory computer readable medium as recited in claim 10 which, when executed by the computer, determines an aerodynamic damping distribution.

14. The non-transitory computer readable medium as recited in claim 11, wherein the aerodynamic damping distribution is determined by solving an eigenvalue problem.

15. The non-transitory computer readable medium as recited in claim 8, wherein the output is displayed on a computer screen.

16. The non-transitory computer readable medium as recited in claim 8, wherein the output is stored in a computer memory.

17. The non-transitory computer readable medium as recited in claim 8, wherein the output is downloadable.

* * * * *